United States Patent
Chihara et al.

(10) Patent No.: US 10,875,100 B2
(45) Date of Patent: Dec. 29, 2020

(54) SINTERED BODY AND CUTTING TOOL

(71) Applicant: Sumitomo Electric Industries, Ltd., Osaka (JP)

(72) Inventors: Kentaro Chihara, Itami (JP); Satoru Kukino, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 15/958,701

(22) Filed: Apr. 20, 2018

(65) Prior Publication Data

US 2018/0236562 A1      Aug. 23, 2018

Related U.S. Application Data

(63) Continuation of application No. 15/300,115, filed as application No. PCT/JP2016/054394 on Feb. 16, 2016, now abandoned.

(30) Foreign Application Priority Data

Feb. 26, 2015   (JP) ................................ 2015-037062

(51) Int. Cl.
   *B23B 27/14*      (2006.01)
   *B23B 27/20*      (2006.01)
   *C04B 35/583*    (2006.01)
   *C22C 29/16*     (2006.01)

(52) U.S. Cl.
   CPC ............. *B23B 27/14* (2013.01); *B23B 27/20* (2013.01); *C04B 35/583* (2013.01); *C22C 29/16* (2013.01)

(58) Field of Classification Search
   None
   See application file for complete search history.

(56) References Cited

U.S. PATENT DOCUMENTS

| | | | |
|---|---|---|---|
| 6,635,593 | B1 | 10/2003 | Kukino et al. |
| 2004/0023035 | A1 | 2/2004 | Brandon et al. |
| 2013/0000213 | A1 | 1/2013 | Okamura et al. |
| 2013/0291446 | A1 | 11/2013 | Kukino et al. |
| 2014/0178138 | A1 | 6/2014 | Watatani et al. |
| 2015/0239050 | A1 | 8/2015 | Hirano et al. |

FOREIGN PATENT DOCUMENTS

| | | |
|---|---|---|
| EP | 1 006 093 A1 | 6/2000 |
| EP | 1 932 816 A1 | 6/2008 |
| EP | 3210955 A1 | 8/2017 |
| JP | H08-109070 A | 4/1996 |
| JP | 2000-226262 A | 8/2000 |
| JP | 2011-140415 A | 7/2011 |
| JP | 2011-189421 A | 9/2011 |
| JP | 2014-144533 A | 8/2014 |
| JP | 2014-144911 A | 8/2014 |
| JP | 2014-217933 A | 11/2014 |
| JP | 2015-044723 A | 3/2015 |
| WO | 00/47537 A1 | 8/2000 |
| WO | 2011/111261 A1 | 9/2011 |

OTHER PUBLICATIONS

Wang, Zixing et al. "The Microstructure and Mechanical Properties of Inconel 718 Fine Grain Ring Forging" 7th International Symposium on Superalloy 718 and Derivatives. TMS (The Minerals, Metals & Materials Society). (2010).*
International Search Report in International Application No. PCT/JP2016/054394, dated Apr. 12, 2016.
U.S. Appl. No. 15/300,155, filed Sep. 28, 2016.
Liew, et al., "Wear characteristics of PCBN tools in the ultra-precision machining of stainless steel at low speeds" WEAR, vol. 254, No. 3-4, XP055081833, Feb. 1, 2003, pp. 265-277.
Office Action issued in U.S. Appl. No. 15/300,155, dated Jan. 22, 2018.
U.S. Appl. No. 15/958,643, filed Apr. 20, 2018.
Office Action issued in U.S. Appl. No. 15/958,643 dated Dec. 16, 2019.
Office Action dated Mar. 26, 2019 in the counterpart U.S. Appl. No. 15/958,643.
Notice of Allowance issued in U.S. Appl. No. 15/958,643 dated Apr. 9, 2020.
Chihara et al., "Study on Microstructure and Machinability in Cutting of Ni-Based Heat Resistant Alloy Using CBN Inserts," The Manufacturing & Machine Tool Conference, vol. 3, Oct. 22, 2016.
Notice of Allowance issued in U.S. Appl. No. 15/958,643 dated Jun. 17, 2020.

* cited by examiner

Primary Examiner — Colleen P Dunn
Assistant Examiner — Ross J Christie
(74) Attorney, Agent, or Firm — Baker Botts L.L.P.; Michael A. Sartori

(57) ABSTRACT

A sintered body includes cubic boron nitride grains as hard phase grains, and has a thermal conductivity of not less than 15 $W \cdot m^{-1} \cdot K^{-1}$ and not more than 40 $W \cdot m^{-1} \cdot K^{-1}$, for cutting a nickel-based heat-resistant alloy formed of crystal grains having a fine grain size represented by a grain size number of more than 5 defined by ASTM standard E112-13. A cutting tool includes this sintered body. Accordingly, the sintered body having both high wear resistance and high fracture resistance, as well as the cutting tool including the sintered body are provided.

6 Claims, No Drawings

SINTERED BODY AND CUTTING TOOL

CROSS-REFERENCE TO RELATED APPLICATIONS

This application is a Continuation of U.S. patent application Ser. No. 15/300,115, filed Sep. 28, 2016, which is a 371 of International Application No. PCT/JP2016/054394, filed on Feb. 16, 2016, which claims the benefit of Japanese Application No. 2015-037062, filed on Feb. 26, 2015.

TECHNICAL FIELD

The present invention relates to a sintered body for cutting a nickel-based heat-resistant alloy and to a cutting tool including this sintered body, and particularly relates to a sintered body for cutting a nickel-based heat-resistant alloy formed of crystal grains with a fine grain size, and to a cutting tool including this sintered body.

BACKGROUND ART

A nickel-based heat-resistant alloy is an alloy based on nickel to which chromium, iron, niobium, molybdenum, and the like are added. The nickel-based heat-resistant alloy is excellent in high-temperature characteristics such as thermal resistance, corrosion resistance, oxidation resistance, and creep resistance, and suitable for use in applications requiring thermal resistance, such as aircraft jet engine, automobile engine, and industrial turbine. However, the nickel-based heat-resistant alloy is a material difficult to cut.

As a cutting tool for cutting such a nickel-based heat-resistant alloy, a cutting tool has been proposed including a sintered body which contains cubic boron nitride having the second highest strength after diamond and having high wear resistance.

WO00/47537 (PTD 1) for example discloses, as a sintered body to be included in the cutting tool as described above, a sintered body with high crater resistance and high strength containing 50 vol % to 78 vol % of high pressure phase boron nitride and a balance of a binder phase. Japanese Patent Laying-Open No. 2000-226262 (PTD 2) also discloses a high-hardness high-strength sintered body produced by sintering hard grains which are high-pressure-type boron nitride grains each covered with a coating layer, and a binder phase uniting the hard grains. Moreover, Japanese Patent Laying-Open No. 2011-140415 (PTD 3) discloses a sintered body containing cubic boron nitride, a first compound, and a second compound, in which the content of the cubic boron nitride is not less than 35 vol % and not more than 93 vol %.

CITATION LIST

Patent Document

PTD 1: WO00/47537
PTD 2: Japanese Patent Laying-Open No. 2000-226262
PTD 3: Japanese Patent Laying-Open No. 2011-140415

SUMMARY OF INVENTION

Technical Problem

A problem of respective sintered bodies disclosed in WO00/47537 (PTD 1), Japanese Patent Laying-Open No. 2000-226262 (PTD 2), and Japanese Patent Laying-Open No. 2011-140415 (PTD 3) is that the fracture resistance of the sintered bodies is not high while the wear resistance is high when the sintered bodies are used for cutting a workpiece. Fracture of the cutting tool is a critical problem when used for cutting parts of an aircraft jet engine, an automobile engine, and the like for which high dimensional accuracy and high surface quality are required. Particularly when the cutting tool is used for cutting a nickel-based heat-resistant alloy formed of crystal grains with a fine grain size, specifically a grain size number of more than 5 defined by American Society for Testing and Materials (hereinafter also referred to as ASTM) standard E112-13, there is a problem that a fracture called boundary damage is likely to occur to a cutting blade of the cutting tool, in addition to normal wear of the flank face of the cutting tool. Therefore, a sintered body exhibiting both high wear resistance and high fracture resistance when used for cutting a workpiece is required.

An object is therefore to provide a sintered body having both high wear resistance and high fracture resistance, as well as a cutting tool including this sintered body.

Solution to Problem

A sintered body in an aspect of the present invention is a sintered body including cubic boron nitride grains as hard phase grains, and having a thermal conductivity of not less than 15 $W \cdot m^{-1} \cdot K^{-1}$ and not more than 40 $W \cdot m^{-1} \cdot K^{-1}$, for cutting a nickel-based heat-resistant alloy formed of crystal grains having a fine grain size represented by a grain size number of more than 5 defined by American Society for Testing and Materials standard E112-13.

A cutting tool in another aspect of the present invention is a cutting tool including the sintered body as described above.

Advantageous Effects of Invention

According to the foregoing, a sintered body having both high wear resistance and high fracture resistance, as well as a cutting tool including this sintered body can be provided.

DESCRIPTION OF EMBODIMENTS

Description of Embodiments of the Invention

A sintered body in an embodiment of the present invention is a sintered body including cubic boron nitride grains as hard phase grains, and having a thermal conductivity of not less than 15 $W \cdot m^{-1} \cdot K^{-1}$ and not more than 40 $W \cdot m^{-1} \cdot K^{-1}$, for cutting a nickel-based heat-resistant alloy formed of crystal grains having a fine grain size represented by a grain size number of more than 5 defined by American Society for Testing and Materials (hereinafter also referred to as ASTM) standard E112-13. The sintered body in the present embodiment has a thermal conductivity of not less than 15 $W \cdot m^{-1} \cdot K^{-1}$ and not more than 40 $W \cdot m^{-1} \cdot K^{-1}$, and therefore exhibits both high wear resistance derived from the cubic boron nitride grains and high fracture resistance when used for cutting a nickel-based heat-resistant alloy which is formed of crystal grains having a fine grain size represented by a grain size number of more than 5 defined by ASTM standard E112-13.

The sintered body in the present embodiment may further include a binder and different-type hard phase grains including at least one selected from the group consisting of silicon nitride, SiAlON, and alumina, as the hard phase grains other than the cubic boron nitride grains. This sintered body thus further includes a binder and different-type hard phase grains including at least one selected from the group consisting of silicon nitride, SiAlON, and alumina, as the hard phase grains other than the cubic boron nitride grains, to thereby exhibit both high wear resistance and high fracture resistance when used for cutting a nickel-based heat-resistant alloy formed of crystal grains having a fine grain size represented by a grain size number of more than 5 defined by ASTM standard E112-13.

Regarding the sintered body in the present embodiment, a ratio $V_{BN}/V_H$ of a volume $V_{BN}$ of the cubic boron nitride grains to a volume $V_H$ of the different-type hard phase grains may be not less than 1 and not more than 6. This sintered body thus has a ratio $V_{BN}/V_H$ of not less than 1 and not more than 6, as a ratio of a volume $V_{BN}$ of the cubic boron nitride grains to a volume $V_H$ of the different-type hard phase grains, to thereby have both high wear resistance and high fracture resistance.

Regarding the sintered body in the present embodiment, the SiAlON may include cubic SiAlON. This sintered body thus includes cubic SiAlON which has low reactivity to the metal and higher hardness than those of α-SiAlON and β-SiAlON, to thereby have higher wear resistance.

The SiAlON may further include at least one of α-SiAlON and β-SiAlON, and a peak intensity ratio Rc of an intensity at an X-ray diffraction main peak of the cubic SiAlON to a sum of respective intensities at respective X-ray diffraction main peaks of the α-SiAlON, the β-SiAlON, and the cubic SiAlON may be not less than 20%. This sintered body thus includes the cubic SiAlON, and at least one of α-SiAlON and β-SiAlON, and has a ratio of 20% or more of the cubic SiAlON to the sum of the α-SiAlON, the β-SiAlON, and the cubic SiAlON, in term of the intensity at a main peak of X-ray diffraction. Accordingly, the sintered body has both high wear resistance and high fracture resistance.

Regarding the sintered body in the present embodiment, the binder may include at least one kind of binder selected from the group consisting of at least one kind of element out of titanium, zirconium, aluminum, nickel, and cobalt, nitrides, carbides, oxides, carbonitrides, and borides of the elements, and solid solutions thereof. In this sintered body, the binder strongly bonds the different-type hard phase grains and the cubic boron nitride grains, and increases the fracture toughness of the sintered body. The sintered body therefore has higher fracture resistance.

Regarding the sintered body in the present embodiment, a content of the hard phase grains in the sintered body may be not less than 60 vol % and not more than 90 vol %. This sintered body has well-balanced high wear resistance and high fracture resistance.

Regarding the sintered body in the present embodiment, the sintered body may have a Vickers hardness of not less than 22 GPa. This sintered body thus has a Vickers hardness of not less than 22 GPa, and therefore has high wear resistance.

Regarding the sintered body in the present embodiment, the nickel-based heat-resistant alloy may be Inconel® 718. This sintered body also exhibits both high wear resistance and high fracture resistance when used for cutting Inconel® 718 formed of crystal grains with a fine grain size represented by a grain size number of more than 5 defined by ASTM standard E112-13, which is a typical example of the nickel-based heat-resistant alloy.

A cutting tool in another embodiment of the present invention is a cutting tool including the sintered body in the aforementioned embodiment. The cutting tool in the present embodiment includes the sintered body in the aforementioned embodiment, and therefore exhibits both high wear resistance and high fracture resistance when used for cutting a nickel-based heat-resistant alloy which is formed of crystal grains having a fine grain size represented by a grain size number of more than 5 defined by ASTM standard E112-13.

DETAILS OF EMBODIMENTS OF THE INVENTION

First Embodiment: Sintered Body

{Sintered Body}
A sintered body in an embodiment of the present invention is a sintered body including cubic boron nitride grains as hard phase grains, and having a thermal conductivity of not less than 15 $W \cdot m^{-1} \cdot K^{-1}$ and not more than 40 $W \cdot m^{-1} \cdot K^{-1}$, for cutting a nickel-based heat-resistant alloy formed of crystal grains having a fine grain size represented by a grain size number of more than 5 defined by American Society for Testing and Materials (ASTM) standard E112-13. Crystal grains having a smaller grain size number are coarser crystal grains. Regarding the nickel-based heat-resistant alloy to be cut by means of the sintered body in the present embodiment, the grain size number of 5 or less corresponds to a crystal grain size of about 50 μm or more. The sintered body in the present embodiment has a thermal conductivity of not less than 15 $W \cdot m^{-1} \cdot K^{-1}$ and not more than 40 $W \cdot m^{-1} \cdot K^{-1}$, and therefore exhibits both high wear resistance and high fracture resistance when used for cutting a nickel-based heat-resistant alloy which is formed of crystal grains having a fine grain size represented by a grain size number of more than 5 defined by ASTM standard E112-13.

In order to develop a sintered body exhibiting both high wear resistance and high fracture resistance when used for cutting a nickel-based heat-resistant alloy which is formed of crystal grains having a fine grain size represented by a grain size number of more than 5 defined by ASTM standard E112-13, the inventors of the present invention initially examined the relation between cutting resistance and damage to a cutting blade. The cutting resistance is the cutting resistance against the cutting blade of a cutting tool including the sintered body containing cubic boron nitride grains with high wear resistance, when cutting a nickel-based heat-resistant alloy. As a result of this, the following was found. When a nickel-based heat-resistant alloy was cut, the alloy was cut with a significantly higher cutting resistance as compared with the cutting resistance when cutting a hardened steel which is also a difficult-to-cut material. Therefore, due to contact with swarf with high hardness, a deep boundary damage in a V-shape as seen from the flank face of the tool was generated in the tool. It was also found that the boundary damage extending into the cutting blade caused decrease of the strength of the cutting edge.

The inventors of the present invention considered that a cause of such a boundary damage was decrease of the temperature of the cutting edge during cutting, due to the high thermal conductivity of the cubic boron nitride grains forming the cutting blade.

In the sintered body with a high content of cubic boron nitride grains having the second highest thermal conductivity after diamond grains, necking between the cubic boron nitride grains occurs in the sintered body to form a three-dimensional mesh structure. Therefore, the thermal conductivity increases through this three-dimensional mesh structure. Particularly in the case where the sintered body includes a metal binder such as cobalt (Co) or aluminum (Al), as a binder of the cubic boron nitride grains, the thermal conductivity of the sintered body is further increased by the high thermal conductivity of the metal binder itself, to a thermal conductivity of 70 w·m$^{-1}$·K$^{-1}$.

The inventors of the present invention examined the relation between the cutting resistance and the thermal conductivity of the sintered body including the cubic boron nitride grains forming the cutting blade of the cutting tool. As a result, the inventors found that increase of the thermal conductivity of the sintered body caused increase of the cutting resistance when a Ni-based heat resistant alloy such as Inconel® is cut. When a Ni-based heat-resistant alloy is cut, the temperature at a portion where a workpiece (work) and the cutting edge of the cutting tool contact each other increases to approximately 700° C., and accordingly the workpiece at the contact portion is softened. Then, the deforming stress decreases and accordingly the cutting resistance decreases. However, when cutting is performed with a cutting tool which is formed of a sintered body having a high content of cubic boron nitride grains and having a three-dimensional mesh structure of the grains, and which has high cooling ability, it is considered that the temperature of the cutting edge during cutting is kept at a low temperature, and therefore, the workpiece is not softened and the cutting resistance increases.

As set forth above, the inventors of the present invention examined the relation between the cutting resistance and the thermal conductivity of the sintered body forming the cutting blade of the cutting tool and including cubic boron nitride grains, and consequently found that a higher thermal conductivity of the sintered body forming the cutting blade of the cutting tool caused a higher cutting resistance and a greater damage to the cutting blade.

Further, the inventors of the present invention exhaustively performed cutting of workpieces which were a plurality of nickel-based heat-resistant alloys different from each other in grain size of crystal grains, and consequently found that a coarser grain size of the crystal grains of the nickel-based heat-resistant alloy was accompanied by a higher cutting resistance during the cutting. In particular, it was found that, when a nickel-based heat-resistant alloy was cut that was formed of crystal grains with a coarse grain size represented by a grain size number of 5 or less defined by ASTM standard E112-13, the cutting tool reached the end of the life in a considerably short time due to fracture, before wear increased. In contrast, it was found that, when a nickel-based heat-resistant alloy was cut which was formed of crystal grains with a fine grain size represented by a grain size number of more than 5 defined by ASTM standard E112-13, and which may be used for heat resistant parts of a turbine disk of an aircraft engine or the like required to have creep resistance, the depth of a damage to the cutting blade of the cutting tool was smaller as compared with the case where a nickel-based heat-resistant alloy was cut that was formed of crystal grains with a coarse grain size represented by a grain size number of 5 or less defined by ASTM standard E112-13. However, it was found that the aforementioned boundary damage occurred and normal wear occurred to the tool flank face.

Generally, the material for the cutting tool is often required to have high thermal conductivity for the purpose of preventing plastic deformation (thermal deformation) or thermal cracks of the cutting tool itself. However, the inventors of the present invention found that, in the case of cutting a nickel-based heat-resistant alloy formed of crystal grains with a fine grain size represented by a grain size number of more than 5 defined by ASTM standard E112-13, increase of the thermal conductivity of the material for the cutting tool is accompanied by increase of a boundary damage of the cutting edge of the cutting blade and increase of the cutting resistance, and accordingly the cutting edge of the cutting blade is likely to fracture. Therefore, contrary to the conventional approach, the inventors tried decreasing the thermal conductivity of the sintered body including cubic boron nitride grains.

As a result of this trial, the inventors found that the grain size of the cubic boron nitride powder used as a material for the sintered body could be made finer and an inorganic compound such as TiN, TiC, TiAlN, or AlB$_2$ could be used as a binder to thereby decrease the thermal conductivity of the sintered body. Preferably, the cubic boron nitride powder has an average grain size of 1.5 μm or less.

Alternatively, silicon nitride, SiAlON, alumina, or the like with crystal grains having lower thermal conductivity than cubic boron nitride grains was added to the sintered body to thereby obtain a thermal conductivity of the sintered body which was an intermediate thermal conductivity between that of the conventional ceramic tool and that of a cubic boron nitride tool, specifically a thermal conductivity of not less than 15 W·m$^{-1}$·K$^{-1}$ and not more than 40 W·m$^{-1}$·K$^{-1}$. It was found that a sintered body could thus be obtained which exhibited both high wear resistance and high fracture resistance when used for cutting a nickel-based heat-resistant alloy formed of crystal grains with a fine grain size represented by a grain size number or more than 5 defined by ASTM standard E112-13, and accordingly the present invention was completed.

In order for the sintered body in the present embodiment to have both high wear resistance and high fracture resistance, the sintered body includes cubic boron nitride grains and still has a thermal conductivity of not less than 15 W·m$^{-1}$·K$^{-1}$ and not more than 40 W·m$^{-1}$·K$^{-1}$, preferably not less than 20 W·m$^{-1}$·K$^{-1}$ and not more than 40 W·m$^{-1}$·K$^{-1}$, and more preferably not less than 20 W·m$^{-1}$·K$^{-1}$ and not more than 35 w·m$^{-1}$·K$^{-1}$. If the thermal conductivity of the sintered body is more than 40 W·m$^{-1}$·K$^{-1}$, the temperature of the cutting edge of the cutting tool formed of this sintered body may decrease to become less than the softening temperature of the workpiece, resulting in insufficient suppression of boundary damage to the cutting edge of the cutting blade. If the thermal conductivity of the sintered body is less than 15 W·m$^{-1}$·K$^{-1}$, the cutting temperature may become excessively high, resulting in promotion of wear of the cutting tool formed of this sintered body.

The thermal conductivity of the sintered body is determined in the following way. From the sintered body, a sample with a diameter of 18 mm and a thickness of 1 mm is cut as a sample to be used for measuring the thermal conductivity, and a laser-flash-method thermal constant measuring apparatus is used to measure the specific heat and the thermal diffusivity. The thermal conductivity is calculated by multiplying the thermal diffusivity by the specific heat and the density of the sintered body.

Preferably, the sintered body in the present embodiment further includes a binder and different-type hard phase grains including at least one selected from the group consisting of silicon nitride, SiAlON, and alumina, as the hard phase grains other than the cubic boron nitride grains. This sintered body thus further includes: the different-type hard phase grains which are grains of at least one selected from the group consisting of silicon nitride, SiAlON, and alumina; the cubic boron nitride grains; and the binder, to thereby exhibit both high wear resistance and high fracture resistance when used for cutting a nickel-based heat-resistant alloy formed of crystal grains having a fine grain size represented by a grain size number of more than 5 defined by ASTM standard E112-13.

Regarding the sintered body in the present embodiment, a ratio $V_{BN}/V_H$ of a volume $V_{BN}$ of the cubic boron nitride grains to a volume $V_H$ of the different-type hard phase grains is preferably not less than 1 and not more than 6. This sintered body thus has a ratio $V_{BN}/V_H$ of not less than 1 and not more than 6, as a ratio of the volume of the cubic boron nitride grains to the volume of the different-type hard phase grains, to thereby have both high wear resistance and high fracture resistance. If the ratio $V_{BN}/V_H$ is less than 1, the content of the cubic boron nitride grains having high hardness is relatively low, resulting in decrease of the hardness of the sintered body, which may cause decrease of the wear resistance of a cutting tool formed of this sintered body. In contrast, if the ratio $V_{BN}/V_H$ is more than 6, the cubic boron nitride grains having high thermal conductivity are excessively present in the sintered body, which may make it impossible to have a thermal conductivity of 40 W·m$^{-1}$·K$^{-1}$ or less.

Regarding the sintered body in the present embodiment, a predetermined amount of the different-type hard phase grains in a powder state and a predetermined amount of the cubic boron nitride grains in a powder state are added and mixed before being sintered. It was confirmed that when X-ray diffraction was performed before and after sintering, there was no significant change in peak intensity ratio between the different-type hard phase grains and the cubic boron nitride grains and the volume ratio between the different-type hard phase grains and the cubic boron nitride grains added in the powder state was substantially maintained as it was in the sintered body. Therefore, X-ray diffraction of the sintered body is performed and a ratio $V_{BN}/V_H$ of a volume $V_{BN}$ of the cubic boron nitride grains to a volume $V_H$ of the different-type hard phase grains can be calculated from the X-ray diffraction peak intensity ratio between the different-type hard phase grains and the cubic boron nitride grains. Other than the above-described X-ray diffraction, a CP (cross section polisher) (manufactured by JEOL Ltd.) or the like may be used to mirror polish a sintered-body cross section, observe the cross section with an SEM (scanning electron microscope), examine constituent elements of crystal grains by means of EDX (energy dispersive X-ray spectrometry), and identify the different-type hard phase grains and the cubic boron nitride grains, to thereby determine an area ratio therebetween to be regarded as a volume ratio. In this way, the ratio $V_{BN}/V_H$ of a volume $V_{BN}$ of the cubic boron nitride grains to a volume $V_H$ of the different-type hard phase grains can also be calculated.

Regarding the sintered body in the present embodiment, preferably the SiAlON includes cubic SiAlON. This sintered body thus includes cubic SiAlON which has low reactivity to the metal and higher hardness than those of α-SiAlON and β-SiAlON, to thereby have higher wear resistance.

Preferably, the SiAlON further includes at least one of α-SiAlON and β-SiAlON, and a peak intensity ratio Rc of an intensity at an X-ray diffraction main peak of the cubic SiAlON to a sum of respective intensities at respective X-ray diffraction main peaks of the α-SiAlON, the β-SiAlON, and the cubic SiAlON is not less than 20% (the peak intensity ratio is hereinafter also referred to as peak intensity ratio Rc of the cubic SiAlON). This sintered body thus includes the cubic SiAlON and at least one of α-SiAlON and β-SiAlON, and the ratio, in terms of the intensity at the X-ray diffraction main peak, of the cubic SiAlON to the sum of the α-SiAlON, the β-SiAlON, and the cubic SiAlON is not less than 20%. Accordingly, the sintered body has both high wear resistance and high fracture resistance.

Peak intensity ratio Rc of the cubic SiAlON is an index corresponding to the ratio of the cubic SiAlON to the different-type hard phase grains. The peak intensity ratio Rc of the cubic SiAlON may be determined as follows. The sintered body is surface-ground with a diamond abrasive (hereinafter referred to as #400 diamond abrasive) formed of diamond abrasive grains passing a #400 sieve (a sieve with a mesh size of 38 μm). From an X-ray diffraction pattern obtained by measuring the ground surface by means of characteristic X-ray of Cu-Kα, a peak intensity $Ic_{(311)}$ of (311) plane which is a main peak of the cubic SiAlON, a peak intensity $Iα_{(201)}$ of (201) plane which is a main peak of the α-SiAlON, and a peak intensity $Iβ_{(200)}$ of (200) plane which is a main peak of β-SiAlON, can be determined. The values of these peak intensities can be used to calculate peak intensity ratio Rc of the cubic SiAlON based on the following formula (I). If peak intensity ratio Rc of the cubic SiAlON is less than 20%, the hardness of the sintered body decreases, and the wear resistance may decrease.

$$Rc = Ic_{(311)}/(Ic_{(311)} + Iα_{(201)} + Iβ_{(200)}) \times 100 \tag{I}$$

Regarding the sintered body in the present embodiment, preferably the binder includes at least one kind of binder selected from the group consisting of at least one kind of element out of titanium (Ti), zirconium (Zr), aluminum (Al), nickel (Ni), and cobalt (Co), nitrides, carbides, oxides, carbonitrides, and borides of the elements, and solid solutions thereof. In this sintered body, the binder strongly bonds the different-type hard phase grains and the cubic boron nitride grains, and increases the fracture toughness of the sintered body. The sintered body therefore has high fracture resistance.

As this binder, a metal element such as Al, Ni, Co, an intermetallic compound such as TiAl, or a compound such as TiN, ZrN, TiCN, TiAlN, Ti$_2$AlN, TiB$_2$, AlB$_2$, for example, is suitably used. In the sintered body including this binder, the different-type hard phase grains and the cubic boron nitride grains are strongly bonded. In addition, in the case where the fracture toughness of the binder itself is high, the fracture toughness of the sintered body is accordingly high, and thus the fracture resistance of the sintered body is high.

Regarding the sintered body in the present embodiment, the content of the hard-phase grains in the sintered body is preferably not less than 60 vol % and not more than 90 vol % (the content refers to the content of the cubic boron nitride grains when the cubic boron nitride grains are included as hard-phase grains, and refers to the total content of the different-type hard phase grains and the cubic boron nitride grains when the different-type hard phase grains and the cubic boron nitride grains are included as hard-phase grains; therefore, the content of hard-phase grains may be defined as the total content of the different-type hard phase grains and the cubic boron nitride grains regardless of whether the different-type hard phase grains are present or not, as the content of the different-type hard phase grains may be regarded as 0 vol % when the hard-phase grains do not include the different-type hard phase grains). This sintered body has well-balanced high wear resistance and high fracture resistance. If the content of hard-phase grains (the total content of the different-type hard phase grains and the cubic boron nitride grains) is less than 60 vol %, the sintered body has a lower hardness, which may result in lower wear resistance. If the content of hard-phase grains (the total content of the different-type hard phase grains and the cubic boron nitride grains) is more than 90 vol %, the sintered body has a lower fracture toughness, which may result in lower fracture resistance.

Regarding the sintered body in the present embodiment, a predetermined amount of the different-type hard phase grains in a powder state, a predetermined amount of the cubic boron nitride grains in a powder state, and a predetermined amount of the binder in a powder state are added and mixed before being sintered. It was confirmed that when X-ray diffraction was performed before and after sintering, there was no significant change in peak intensity ratio between the different-type hard phase grains, the cubic boron nitride grains, and the binder, and the volume ratio between the different-type hard phase grains, the cubic boron nitride grains, and the binder added in the powder state was substantially maintained as it was in the sintered body. Other than the above-described X-ray diffraction, a CP or the like may be used to mirror polish a sintered-body cross section, observe the cross section with an SEM, examine constituent elements of crystal grains by means of EDX, and identify the different-type hard phase grains, the cubic boron nitride grains, and the binder to thereby determine an area ratio therebetween to be regarded as a volume ratio. In this way as well, the volume ratio between the different-type hard phase grains, the cubic boron nitride grains, and the binder included in the sintered body can be determined.

Regarding the sintered body in the present embodiment, the sintered body has a Vickers hardness of preferably not less than 22 GPa, and more preferably not less than 28 GPa. This sintered body thus has a Vickers hardness of not less than 22 GPa, and therefore has high wear resistance. If the Vickers hardness is less than 22 GPa, the wear resistance may be low.

The Vickers hardness of the sintered body in the present embodiment may be measured as follows. The sintered body embedded in a Bakelite resin is polished for 30 minutes with diamond abrasive grains of 9 μm and for 30 minutes with diamond abrasive grains of 3 μm. After this, a Vickers hardness tester is used to press a diamond indenter into the polished surface of the sintered body with a load of 10 kgf. From the indentation formed by the pressing of the diamond indenter, the Vickers hardness $H_{V10}$ is determined. Further, the length of a crack extending from the indentation is measured. Based on the IF (Indentation-Fracture) method under JIS R 1607: 2010 (Testing methods for fracture toughness of fine ceramics at room temperature), the fracture toughness is determined.

Regarding the sintered body in the present embodiment, the nickel-based heat-resistant alloy is preferably Inconel® 718. This sintered body also exhibits high fracture resistance in addition to high wear resistance when used for cutting Inconel® 718 formed of crystal grains with a fine grain size represented by a grain size number of more than 5 defined by ASTM standard E112-13, which is a typical example of the nickel-based heat-resistant alloy.

Inconel® 718 is an alloy mainly including 50 to 55 mass % of nickel (Ni), 17 to 21 mass % of chromium (Cr), 4.75 to 5.50 mass % of niobium (Nb), 2.80 to 3.30 mass % of molybdenum (Mo), and about 12 to 24 mass % of iron (Fe), for example. Inconel® 718 is excellent in high-temperature strength provided by an Nb compound generated through age-hardening, and used for aircraft jet engine and various high-temperature structural members. Meanwhile, in terms of cutting, Inconel® 718 is a difficult-to-cut material which promotes wear of the cutting tool due to high affinity with the tool material, and which is likely to cause fracture of the tool due to the large high-temperature strength of the workpiece.

{Method of Manufacturing Sintered Body}

The method of manufacturing the sintered body in the present embodiment is not particularly limited. In order to efficiently manufacture the sintered body having both high wear resistance and high fracture resistance, the method includes the step of preparing different-type hard phase powder, the step of mixing the different-type hard-phase powder, cubic boron nitride powder, and binder powder, and the sintering step. The method will hereinafter be described in the order of the steps.

Step of Preparing Different-Type Hard Phase Powder

As the different-type hard phase powder, β-SiAlON powder and c-SiAlON powder synthesized in the following way may be used, in addition to silicon nitride powder and alumina powder having an average grain size of 5 μm or less.

β-SiAlON represented by a chemical formula: $Si_{6-Z}Al_ZO_ZN_{8-Z}$ (where z is larger than 0 and not more than 4.2) may be synthesized from silica ($SiO_2$), alumina ($Al_2O_3$), and carbon (C) as starting materials, using the general carbon reduction nitriding method, in a nitrogen ambient at atmospheric pressure.

Powder of β-SiAlON may also be obtained by using a high-temperature nitriding synthesis method to which applied nitriding reaction of metal silicon in a nitrogen ambient at atmospheric pressure or more, as represented by the following formula (II).

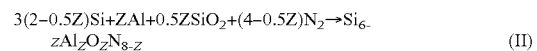

$$3(2-0.5Z)Si + ZAl + 0.5ZSiO_2 + (4-0.5Z)N_2 \rightarrow Si_{6-Z}Al_ZO_ZN_{8-Z} \qquad (II)$$

Si powder (with an average grain size of 0.5 to 45 μm and a purity of 96% or more, more preferably 99% or more), $SiO_2$ powder (with an average grain size of 0.1 to 20 μm), and Al powder (with an average grain size of 1 to 75 μm) are weighed in accordance with a desired value of Z, and thereafter mixed with a ball mill or shaker mixer or the like, to thereby prepare material powder for synthesizing β-SiAlON. At this time, other than the above formula (II), aluminum nitride (AlN) and/or alumina ($Al_2O_3$) may be combined appropriately as Al components. The temperature at which β-SiAlON powder is synthesized is preferably 2300 to 2700° C. Moreover, the pressure of nitrogen gas filling a container in which β-SiAlON powder is synthesized is preferably 1.5 MPa or more. As a synthesis apparatus which can endure such a gas pressure, a combustion synthesis apparatus or HIP (hot isostatic pressing) apparatus is suitable. Moreover, commercially available α-SiAlON powder and β-SiAlON may be used.

Subsequently, α-SiAlON powder and/or β-SiAlON powder may be treated at a temperature of 1800 to 2000° C. and a pressure of 40 to 60 GPa, to thereby cause phase transformation of a part thereof to cubic SiAlON, and accordingly obtain c-SiAlON powder including cubic SiAlON. For example, in the case where a shock compression process is used for the treatment for causing the phase transformation, a shock pressure of approximately 40 GPa and a temperature of 1800 to 2000° C. may be used to obtain different-type hard phase powder in which cubic SiAlON and α-SiAlON and/or β-SiAlON are mixed. At this time, the shock pressure and the temperature may be changed to control the ratio of the cubic SiAlON to the different-type hard phase grains.

Step of Mixing Different-Type Hard Phase Powder, Cubic Boron Nitride Powder, and Binder Powder To the different-type hard phase powder prepared in the above-described way and the cubic boron nitride powder with an average grain size of 0.1 to 3 µm, powder of a binder, which is at least one kind of binder selected from the group consisting of at least one kind of element out of titanium (Ti), zirconium (Zr), aluminum (Al), nickel (Ni), and cobalt (Co), nitrides, carbides, oxides, carbonitrides, and borides of the elements, and solid solutions thereof, is added and mixed. As this binder powder, powder of a metal element such as Al, Ni, Co having an average grain size of 0.01 to 1 µm, powder of an intermetallic compound such as TiAl having an average grain size of 0.1 to 20 µm, or powder of a compound such as TiN, ZrN, TiCN, TiAlN, $Ti_2AlN$, $TiB_2$, $AlB_2$ having an average grain size of 0.05 to 2 µm, for example, is preferably used. Preferably, 10 to 40 vol % of the binder powder is added, relative to the total amount of the different-type hard phase powder, the cubic boron nitride powder, and the binder powder. If the amount of the added binder powder is less than 10 vol %, the fracture toughness of the sintered body is lower, which may result in lower fracture resistance. If the amount of the added binder powder is more than 40 vol %, the hardness of the sintered body is lower, which may result in lower wear resistance.

For mixing the powder, balls made of silicon nitride or alumina of approximately ϕ3 to 10 mm may be used as media to perform ball-mill mixing for a short time of within 12 hours in a solvent such as ethanol, or perform mixing by means of a medialess mixing apparatus such as ultrasonic homogenizer or wet jet mill, to thereby obtain a slurry mixture in which the different-type hard phase powder, the cubic boron nitride powder, and the binder powder are uniformly dispersed.

The slurry mixture thus obtained is air-dried, or dried with a spray dryer or slurry dryer, or the like, to thereby obtain a powder mixture.

Sintering Step

After the powder mixture is shaped by means of a hydraulic press or the like, the shaped powder mixture is sintered by means of a high-pressure generator such as belt-type ultrahigh pressure press machine, under a pressure of 3 to 7 GPa and at a temperature of 1200 to 1800° C. Prior to sintering, the shaped powder mixture may undergo preliminary sintering to be compacted to a certain extent, which may then be sintered. Moreover, an SPS (spark plasma sintering) apparatus may be used to sinter the powder mixture under a pressure of 30 to 200 MPa and at a temperature kept at 1200 to 1600° C.

Second Embodiment: Cutting Tool

A cutting tool in another embodiment of the present invention is a cutting tool including the sintered body in the above-described first embodiment. The cutting tool in the present embodiment thus includes the sintered body in the first embodiment, and therefore exhibits both high wear resistance and high fracture resistance when cutting a nickel-based heat-resistant alloy formed of crystal grains with a fine grain size represented by a grain size number of more than 5 defined under ASTM standard E112-13. The cutting tool in the present embodiment may suitably be used for cutting a difficult-to-work material such as heat-resistant alloy at a high speed. The nickel-based heat-resistant alloy used for parts of an aircraft or automobile engine is a difficult-to-work material which exhibits a high cutting resistance due to its great high-temperature strength, and which is therefore likely to cause wear and/or fracture of the cutting tool. However, the cutting tool in the present embodiment exhibits excellent wear resistance and fracture resistance even when cutting the nickel-based heat-resistant alloy. In particular, when cutting Inconel® 718 which is used for parts of an aircraft engine, the cutting tool used at a cutting speed of 100 m/min or more exhibits an excellent tool life.

EXAMPLES

Example 1

As the different-type hard phase grains, β-silicon nitride powder (SN—F1 manufactured by Denka Company Limited, with an average grain size of 2 µm), β-SiAlON powder (Z-2 manufactured by Zibo Hengshi Technology Development Co., Ltd., with an average grain size of 2 µm), and α-alumina powder (TM-D manufactured by Taimei Chemicals Co., Ltd., with an average grain size of 0.1 µm) were used. Additionally c-SiAlON powder synthesized in the following way was used as the different-type hard phase grains.

As to preparation of the c-SiAlON powder, a mixture obtained by mixing 500 g of β-SiAlON powder and 9500 g of copper powder functioning as heat sink was placed in a steel pipe, and thereafter shock-compressed with an explosive of an amount which was set so that the temperature was 1900° C. and the shock pressure was 40 GPa, to thereby synthesize the c-SiAlON powder including cubic SiAlON. The powder mixture in the steel pipe after being shock-compressed was removed, and acid-washed to remove the copper powder. In this way, the synthesized powder was obtained. An X-ray diffractometer (X'pert Powder manufactured by PANalytical, Cu-Kα ray, 2θ-θ method, voltage× current: 45 kV×40 A, range of measurement: 2θ=10 to 80°, scan step: 0.03°, scan rate: one step/sec) was used to analyze the synthesized powder. Then, cubic SiAlON (JCPDS card: 01-074-3494) and β-SiAlON (JCPDS card: 01-077-0755) were identified. From an X-ray diffraction pattern of the synthesized powder, the peak intensity $Ic_{(311)}$ of (311) plane which was a main peak of the cubic SiAlON, and the peak intensity $Iβ_{(200)}$ of (200) plane which was a main peak of β-SiAlON, were determined. The peak intensity ratio Rc of the cubic SiAlON calculated from the above-indicated formula (I) was 95%.

For each of Samples No. 1-1 to No. 1-14, TiN powder (TiN-01 manufactured by Japan New Metals Co., Ltd., with an average grain size of 1 µm) was added as a binder at the ratio indicated in Table 1, to a total amount of 30 g of the different-type hard phase powder and the cubic boron nitride powder (SBN—F G1-3 manufactured by Showa Denko K.K., with an average grain size of 2 µm). For Samples No. 1-3 and No. 1-4, both the β-SiAlON powder and the c-SiAlON powder were added at different ratios of the c-SiAlON grains in the SiAlON included in the sintered body. For each of Samples No. 1-1 to No. 1-16, the amount (vol %) of the added binder powder was equal to the volume ratio (vol %) of the binder to the total amount of the different-type hard phase grains, the cubic boron nitride grains, and the binder in the sintered body shown in Table 1. Moreover, for each of Samples No. 1-1 to No. 1-14, the different-type hard phase powder and the cubic boron nitride powder were blended so that their volume ratio was equal to the ratio $V_{BN}/V_H$ of the volume $V_{BN}$ of the cubic boron nitride grains to the volume $V_H$ of the different-type hard phase grains in the sintered body shown in Table 1. The powder, after the blending, of each of Samples No. 1-1 to No. 1-14 was placed in a pot made of polystyrene with a capacity of 150 ml, together with 60 ml of ethanol and 200 g of silicon nitride balls of ϕ6 mm, and subjected to ball mill mixing for 12 hours. A slurry mixture was thus prepared.

The slurry mixture removed from the pot was air-dried, and thereafter passed through a sieve with a mesh opening of 45 μm. Powder to be sintered was thus prepared.

Moreover, Sample No. 1-15 was prepared by mixing only the cubic boron nitride powder and TiN powder as a binder, without adding the different-type hard phase powder. For Sample No. 1-15, fine cubic boron nitride powder (SBN—F G-1 manufactured by Showa Denko KK., with an average grain size of 1 μm) was used as the cubic boron nitride powder.

Moreover, Sample No. 1-16 was prepared by mixing only the cubic boron nitride powder and Co powder (HMP manufactured by Umicore) as a binder, without adding the different-type hard phase powder. For Sample No. 1-16, the same cubic boron nitride powder as that of No. 1-1 to No. 1-14 was used.

The powder to be sintered of each of Samples No. 1-1 to No. 1-16 prepared in the above-described manner was vacuum-packed in a refractory metal capsule with a diameter of ϕ20 mm, and thereafter electrically heated to a temperature of 1500° C. while being pressurized to a pressure of 5 GPa by means of a belt-type ultrahigh pressure press, to thereby prepare a sintered body.

The surface of the sintered body was surface-ground by means of a #400 diamond abrasive, and thereafter X-ray diffraction of the ground surface was performed by means of the aforementioned X-ray diffractometer. From an obtained diffraction pattern, the peak intensity $Ic_{(311)}$ of (311) plane of the cubic SiAlON and the peak intensity $I\beta_{(200)}$ of (200) plane of the β-SiAlON were determined, and the peak intensity ratio Rc of the cubic SiAlON ($Rc=Ic_{(311)}/(Ic_{(311)}+I\beta_{(200)})\times 100$) was calculated. As a result of this, there was substantially no change from the value of the peak intensity ratio Rc of the cubic SiAlON before sintering, to the value thereof after sintering, for any of the sintered bodies of Samples No. 1-3 to No. 1-9 in which the cubic SiAlON was added.

After a cross section of the sintered body was mirror-polished with a CP, an FE-SEM (field emission scanning electron microscope) was used to observe the structure of the sintered body, and an EDX (energy dispersive X-ray spectroscopy) system integrated with the FE-SEM was used to examine constituent elements of the crystal grains in the structure of the sintered body and thereby identify the different-type hard phase grains, the cubic boron nitride grains, and the binder in an image of the SEM. The SEM image was image-processed with WinROOF manufactured by Mitani Corporation, to thereby determine the area ratio between the different-type hard phase grains, the cubic boron nitride grains, and the binder, and the area ratio was regarded as the volume ratio. In this way, the volume ratio between the different-type hard phase grains, the cubic boron nitride grains, and the binder included in the sintered body was determined. As a result of this, in any of respective sintered bodies of Samples No. 1-1 to No. 1-14, the ratio $V_{BN}/V_H$ of the volume $V_{BN}$ of the cubic boron nitride grains to the volume $V_H$ of the different-type hard phase grains in the sintered body was substantially identical to the ratio of the volume of the cubic boron nitride powder to the volume of the different-type hard phase powder as blended. Moreover, in any of respective sintered bodies of Samples No. 1-1 to No. 1-16, the content of the hard-phase grains in the sintered body (the total content of the different-type hard phase grains and the cubic boron nitride grains) (vol %) was substantially identical to the ratio of the hard-phase grains as blended (the total ratio of the different-type hard phase powder and the cubic boron nitride powder as blended) (vol %).

From the sintered body, a sample with a diameter of 18 mm and a thickness of 1 mm was cut as a sample to be used for measuring the thermal conductivity, and a laser-flash-method thermal constant measuring apparatus (LFA447 manufactured by NETZSCH) was used to measure the specific heat and the thermal diffusivity. The thermal conductivity was calculated by multiplying the thermal diffusivity by the specific heat and the density of the sintered body. The results are shown in Table 1.

From the sintered body, a sample to be used for measuring the hardness was cut and embedded in a Bakelite resin. After this, the sample was polished for 30 minutes with diamond abrasive grains of 9 μm and for 30 minutes with diamond abrasive grains of 3 μm. A Vickers hardness tester (HV-112 manufactured by Akashi) was used to press a diamond indenter into a polished surface of the sample with a load of 10 kgf. From the indentation formed by the pressing of the diamond indenter, the Vickers hardness $H_{V10}$ was determined. Further, the length of a crack extending from the indentation was measured. Further, the length of a crack extending from the indentation was measured and, based on the IF method under JIS R 1607: 2010 (Testing methods for fracture toughness of fine ceramics at room temperature), the fracture toughness value was determined. The results are shown in Table 1.

Next, the sintered body was processed into the shape of the brazed insert of DNGA150412 (ISO model number), and the tool life of the brazed insert was evaluated by using the insert for turning of Inconel® 718 (manufactured by Daido-Special Metals Ltd.) with crystal grains having a fine grain size represented by a grain size number of 9 defined by American Society for Testing and Materials (ASTM) standard E112-13. Under the following conditions, an external cylindrical turning test was conducted. A cutting length at which one of the flank face wear and the flank face fracture of the tool cutting edge reached 0.2 mm before the other was determined, and the determined cutting length was regarded as a tool life (km). The results are shown in Table 1. The life factor indicating whether the factor that caused the tool to reach the end of the tool life was wear or fracture is also shown in Table 1.

<Cutting Conditions>

The cutting conditions in the present Example are as follows.

workpiece: Inconel® 718 (manufactured by Daido-Special Metals Ltd., solution heat-treated and age-hardened material, with a Rockwell hardness HRC (a diamond cone with a tip radius of 0.2 mm and a tip angle of 120° was used to apply a load of 150 kgf) corresponding to 44, and with a grain size represented by a grain size number of 9 defined by ASTM standard E112-13)

tool shape: DNGA150412 (ISO model number)

cutting edge shape: chamfer angle −20°×width 0.1 mm cutting speed: 200 m/min depth of cut: 0.3 mm feed rate: 0.2 mm/rev wet condition (water soluble oil)

TABLE 1

| Sample No. | | 1-1 | 1-2 | 1-3 | 1-4 | 1-5 | 1-6 | 1-7 | 1-8 |
|---|---|---|---|---|---|---|---|---|---|
| different-type hard phase grains | | β-silicon nitride | β-SiAlON | β-SiAlON c-SiAlON | β-SiAlON c-SiAlON | c-SiAlON | c-SiAlON | c-SiAlON | c-SiAlON |
| content of hard phase grains (vol %) | | 80 | 80 | 80 | 80 | 80 | 80 | 80 | 80 |
| content of binder (vol %) | | 20 | 20 | 20 | 20 | 20 | 20 | 20 | 20 |
| ratio $V_{BN}/V_H$ | | 3 | 3 | 3 | 3 | 0.8 | 1 | 3 | 6 |
| peak intensity ratio Rc (%) of cubic SiAlON | | — | 0 | 15 | 20 | 90 | 90 | 90 | 90 |
| thermal conductivity ($W \cdot m^{-1} \cdot K^{-1}$) | | 35 | 32 | 31 | 30 | 12 | 15 | 25 | 38 |
| physical properties of sintered body | Vickers hardness (GPa) | 23.7 | 24.1 | 24.5 | 25.2 | 22.3 | 22.9 | 31.2 | 35.3 |
| | fracture toughness ($MPa \cdot m^{1/2}$) | 5.7 | 5.8 | 6.0 | 6.2 | 5.5 | 5.7 | 7.5 | 7.8 |
| cutting performance | cutting length (km) | 0.6 | 0.6 | 0.7 | 1.5 | 0.2 | 0.8 | 2.4 | 1.0 |
| | life factor | wear | wear | wear | wear | wear | wear | wear | fracture |
| notes | | EX | EX | EX | EX | CE | EX | EX | EX |
| Sample No. | | 1-9 | 1-10 | 1-11 | 1-12 | 1-13 | 1-14 | 1-15 | 1-16 |
| different-type hard phase grains | | c-SiAlON | α-alumina | α-alumina | α-alumina | α-alumina | α-alumina | none | none |
| content of hard phase grains (vol %) | | 80 | 95 | 90 | 60 | 55 | 80 | 70 | 80 |
| content of binder (vol %) | | 20 | 5 | 10 | 40 | 45 | 20 | 30 | 20 |
| ratio $V_{BN}/V_H$ | | 6.5 | 3 | 3 | 3 | 3 | 3 | — | — |
| peak intensity ratio Rc (%) of cubic SiAlON | | 90 | — | — | — | — | — | — | — |
| thermal conductivity ($W \cdot m^{-1} \cdot K^{-1}$) | | 43 | 35 | 30 | 18 | 16 | 20 | 25 | 50 |
| physical properties of sintered body | Vickers hardness (GPa) | 33.0 | 32.5 | 30.3 | 22.3 | 21.5 | 24.8 | 29.5 | 38.0 |
| | fracture toughness ($MPa \cdot m^{1/2}$) | 6.4 | 4.7 | 5.3 | 5.8 | 6.5 | 5.5 | 5.2 | 7.3 |
| cutting performance | cutting length (km) | 0.2 | 0.3 | 0.6 | 0.8 | 0.4 | 0.8 | 0.4 | 0.2 |
| | life factor | fracture | fracture | fracture | wear | wear | wear | fracture | fracture |
| notes | | CE | EX | EX | EX | EX | EX | EX | CE |

EX: Example
CE: Comparative Example

Referring to Table 1, the sintered bodies of Samples No. 1-5, No. 1-9, and No. 1-16 having a thermal conductivity of less than 15 $W \cdot m^{-1} \cdot K^{-1}$ or more than 40 $W \cdot m^{-1} \cdot K^{-1}$ reached the end of the tool life when the cutting length reached 0.2 km. The sintered bodies of Samples No. 1-1 to No. 1-4, No. 1-6 to No. 1-8, and No. 1-10 to No. 1-15 having a thermal conductivity of not less than 15 $W \cdot m^{-1} \cdot K^{-1}$ and not more than 40 $W \cdot m^{-1} \cdot K^{-1}$ reached the end of the tool life when the cutting length reached 0.3 to 2.4 km, and the tool life of these sintered bodies was considerably longer, namely 1.5 to 12 times as long as that of the sintered bodies of Sample No. 1-5, 1-9, or 1-16.

As to Sample No. 1-1, the different-type hard phase grains forming the sintered body were β-silicon nitride grains and the Vickers hardness remained to be 23.7 GPa. As a result of this, this sample reached the end of the tool life due to wear when the cutting length reached 0.6 km. Sample No. 1-1 had a shorter life than Sample No. 1-4.

As to Sample No. 1-2, the different-type hard phase grains forming the sintered body were β-SiAlON grains and the Vickers hardness remained to be 24.1 GPa. As a result of this, this sample reached the end of the tool life due to wear when the cutting length reached 0.6 km. Sample No. 1-2 had a shorter life than Sample No. 1-4.

As to Sample No. 1-3, while the different-type hard phase grains forming the sintered body included cubic SiAlON grains, the peak intensity ratio Rc of the cubic SiAlON was an insufficient ratio of 15% and the Vickers hardness remained to be 24.5 GPa. As a result of this, this sample reached the end of the tool life due to wear when the cutting length reached 0.7 km. Sample No. 1-3 had a shorter life than Sample No. 1-4.

As to Sample No. 1-5, because of a low ratio $V_{BN}/V_H$ of 0.8 of the volume $V_{BN}$ of the cubic boron nitride grains to the volume $V_H$ of the different-type hard phase grains forming the sintered body, the thermal conductivity was a low thermal conductivity of 12 $W \cdot m^{-1} \cdot K^{-1}$. This sample reached the end of the tool life due to wear when the cutting length reached 0.2 km.

As to Sample No. 1-9, because of a high ratio $V_{BN}/V_H$ of 6.5 of the volume $V_{BN}$ of the cubic boron nitride grains to the volume $V_H$ of the different-type hard phase grains forming the sintered body, the thermal conductivity was a high thermal conductivity of 43 $W \cdot m^{-1} \cdot K^{-1}$. As a result of this, the temperature of the cutting edge of the tool decreased during cutting, and thus the cutting resistance increased and a boundary damage of the cutting edge increased. Accordingly, the cutting edge of the tool fractured. Due to this, the sample reached the end of the tool life when the cutting length reached 0.2 km.

As to Sample No. 1-10, because of a high content of 95 vol % of the hard phase grains in the sintered body (the total content of the different-type hard phase grains and the cubic boron nitride grains), the fracture toughness was 4.7 MPa·m$^{1/2}$. As a result of this, the cutting edge of the tool fractured and thereby the sample reached the end of the tool life when the cutting length reached 0.3 km. Sample No. 1-10 had a shorter life than Sample No. 1-11.

As to Sample No. 1-13, because of a low content of 55 vol % of the hard phase grains in the sintered body (the total content of the different-type hard phase grains and the cubic boron nitride grains), the Vickers hardness remained to be 21.5 GPa. As a result of this, the sample reached the end of the tool life due to wear when the cutting length reached 0.4 km. Sample No. 1-13 had a shorter life than Sample No. 1-12.

As to Sample No. 1-15, since fine cubic boron nitride grains were used and TiN powder was used as a binder, the thermal conductivity was 25 W·m$^{-1}$·K$^{-1}$ and the tool life was longer than that of Sample No. 1-16. However, since the sintered body did not include different-type hard phase grains, the toughness was low and this sample reached the end of the tool life due to fracture when the cutting length reached 0.4 km.

In contrast, as to Samples No. 1-4, No. 1-6 to No. 1-8, No. 1-12, and No. 1-14 for which the peak intensity ratio Rc of cubic SiAlON in the different-type hard phase grains forming the sintered body, the ratio $V_{BN}/V_H$ of the volume $V_{BN}$ of the cubic boron nitride grains to the volume $V_H$ of the different-type hard phase grains forming the sintered body, and/or the content of the hard phase grains in the sintered body (the total content of the different-type hard phase grains and the cubic boron nitride grains) were controlled so that they were in respective appropriate ranges, the well-balanced Vickers hardness and fracture toughness were obtained. As a result of this, the cutting length at which the sample reached the end of the tool life due to wear or fracture could be extended to 0.8 km or more.

In particular, as to Sample No. 1-7 including cubic boron nitride grains, it was found that this sample having excellent Vickers hardness and fracture toughness accordingly had a longer tool life than Samples No. 1-1 including silicon nitride grains and Sample No. 1-14 including alumina grains.

As for Sample No. 1-16 including no different-type hard phase grains, the thermal conductivity was 50 W·m$^{-1}$·K$^{-1}$. As a result of this, the temperature of the cutting edge of the tool decreased during cutting and thus the cutting resistance increased and a boundary damage of the cutting edge increased. Accordingly, the cutting edge of the tool fractured. Due to this, the sample reached the end of the tool life when the cutting length reached 0.2 km.

Example 2

C-SiAlON powder which was synthesized through shock compression in a similar manner to Example 1 and in which cubic SiAlON had a peak intensity ratio Rc of 95% was used as different-type hard phase powder to be used for preparing respective sintered bodies of Samples No. 2-1 to No. 2-10. The same cubic boron nitride powder (SBN—F G1-3 manufactured by Showa Denko K.K.) as that used for Samples No. 1-1 to No. 1-14 in Example 1 was used as cubic boron nitride powder of Samples No. 2-1 to No. 2-10.

For each of Samples No. 2-1 to No. 2-10, the binder powder shown in Table 2 was added to 30 g in total of the different-type hard phase powder and the cubic boron nitride powder, so that the content of the binder powder to the total amount of the different-type hard phase powder, the cubic boron nitride powder and the binder powder was 20 vol %. At this time, for each of Samples No. 2-1 to No. 2-10, the different-type hard phase powder and the cubic boron nitride powder were blended so that the volume ratio therebetween was equal to the ratio $V_{BN}/V_H$ of 3 of the volume $V_{BN}$ of the cubic boron nitride grains to the volume $V_H$ of the different-type hard phase grains in the sintered body. Moreover, as the binder powder, TiCN powder (TiN—TiC 50/50 manufactured by Japan New Metals Co., Ltd., with an average grain size of 1 μm), TiN powder (TiN-01 manufactured by Japan New Metals Co., Ltd., with an average grain size of 1 μm), TiAl powder (TiAl manufactured by KCM Corporation), Al powder (300F manufactured by Minalco Ltd.), Co powder (HMP manufactured by Umicore), ZrN powder (ZrN-1 manufactured by Japan New Metals Co., Ltd.), and Ti$_2$AlN powder (with an average grain size of 1 μm) were used. For Samples No. 2-8 to No. 2-10, the ceramic component TiN, TiCN, Ti$_2$AlN and the metal component Co or Al were blended at a ratio by mass of 2 (ceramic component) to 1 (metal component).

For each of Samples No. 2-1 to No. 2-10, the powder obtained after the blending was placed in a pot made of polystyrene with a capacity of 150 ml, together with 60 ml of ethanol and 200 g of silicon nitride balls of ϕ6 mm, and subjected to ball mill mixing for 12 hours. A slurry was thus prepared. The slurry removed from the pot was air-dried, and thereafter passed through a sieve with a mesh opening of 45 μm. Powder to be sintered was thus prepared.

The powder to be sintered of each of Samples No. 2-1 to No. 2-10 prepared in the above-described manner was vacuum-packed in a refractory metal capsule with a diameter of ϕ20 mm, and thereafter electrically heated to a temperature of 1500° C. while being pressurized to a pressure of 5 GPa by means of a belt-type ultrahigh pressure press, to thereby prepare a sintered body.

The surface of the sintered body was surface-ground by means of a #400 diamond abrasive, and thereafter X-ray diffraction of the ground surface was performed by means of an X-ray diffractometer. From an obtained diffraction pattern, the peak intensity Ic$_{(311)}$ of (311) plane of the cubic SiAlON and the peak intensity Iβ$_{(200)}$ of (200) plane of the β-SiAlON were determined, and the peak intensity ratio Rc (Ic$_{(311)}$/(Ic$_{(311)}$+Iβ$_{(200)}$)×100) was calculated. The results are shown in Table 2.

After a cross section of the sintered body was mirror-polished with a CP, the volume ratio between the different-type hard phase grains, the cubic boron nitride grains, and the binder included in the sintered body was determined, in a similar manner to Example 1. As a result of this, in any of the sintered bodies of Samples No. 2-1 to No. 2-10, the ratio $V_{BN}/V_H$ of the volume $V_{BN}$ of the cubic boron nitride grains to the volume $V_H$ of the different-type hard phase grains in the sintered body was substantially 3. Moreover, the content of the hard phase grains in the sintered body (the total content of the different-type hard phase grains and the cubic boron nitride grains) was approximately 80 vol %.

From the sintered body, a sample with a diameter of 18 mm and a thickness of 1 mm was cut as a sample to be used for measuring the thermal conductivity, and the thermal conductivity of respective sintered bodies of Samples No. 2-1 to No. 2-10 was calculated in a similar manner to Example 1. The results are shown in Table 2.

From the sintered body, a sample to be used for measuring the hardness was cut, and the Vickers hardness $H_{V10}$ and the fracture toughness value of respective sintered bodies of Samples No. 2-1 to No. 2-10 were determined in a similar manner to Example 1. The results are shown in Table 2.

Next, the sintered body was processed into the shape of the brazed insert of DNGA150412 (ISO model number), and the tool life of the brazed insert was evaluated by using the insert for turning of Hastelloy® X with crystal grains having a fine grain size represented by a grain size number of 6 defined by ASTM standard E112-13. Under the following conditions, an external cylindrical turning test was conducted. A cutting length at which one of the flank face wear and the flank face fracture of the tool cutting edge reached 0.2 mm before the other was determined, and the determined cutting length was regarded as a tool life (km). The results are shown in Table 2. The life factor indicating whether the factor that caused the tool to reach the end of the tool life was wear or fracture is also shown in Table 2.

<Cutting Conditions>

The cutting conditions in the present Example are as follows.
workpiece: Hastelloy® X (manufactured by Haynes International, Inc., solid solution heat-treated material, with a Brinell hardness HB corresponding to 170, and with a grain size represented by a grain size number of 6 defined by ASTM standard E112-13)
tool shape: DNGA150412 (ISO model number)
cutting edge shape: chamfer angle −20°×width 0.1 mm
cutting speed: 200 m/min
depth of cut: 0.2 mm
feed rate: 0.1 mm/rev
wet condition (water soluble oil)

In contrast, as to Samples No. 2-1 to No. 2-3, No. 2-6, and No. 2-7 in which the binder was the ceramic or intermetallic binder, the well-balanced thermal conductivity and Vickers hardness could be obtained. As a result, the cutting length at which the end of the tool life was reached due to wear or fracture could be extended to 0.7 km or more.

As for Samples No. 2-8 to No. 2-10 in which both the ceramic component and the metal component were used as the binder, the sintered bodies exhibited excellent Vickers hardness and fracture toughness. Therefore, the cutting length at which the end of the tool life was reached was 1.0 km or more.

It should be construed that the embodiments and examples disclosed herein are given by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

As seen from the foregoing, the sintered body including cubic boron nitride grains include both the cubic boron nitride grains having excellent hardness and toughness and the ceramic grains having low thermal conductivity, to thereby provide an advantage that the sintered body is excellent in wear resistance when used for cutting a difficult-to-cut material such as nickel-based heat-resistant alloy which has high cutting resistance and which does not easily soften. In addition, the sintered body provides a tool material improving the fracture resistance of the cutting edge of the cutting tool. While the effects produced when cutting Inconel® are disclosed herein in connection with the Examples, the sintered body exhibits excellent wear resistance and fracture resistance when used for cutting a difficult-to-cut

TABLE 2

| Sample No. | | 2-1 | 2-2 | 2-3 | 2-4 | 2-5 | 2-6 | 2-7 | 2-8 | 2-9 | 2-10 |
|---|---|---|---|---|---|---|---|---|---|---|---|
| binder | | TiN | TiCN | TiAl | Al | Co | ZrN | Ti$_2$AlN | TiN, Co | TiCN, Al | TiN, Al |
| peak intensity ratio Rc (%) of cubic SiAlON | | 90 | 84 | 73 | 52 | 61 | 80 | 74 | 71 | 70 | 66 |
| thermal conductivity (W·m$^{-1}$·K$^{-1}$) | | 25 | 27 | 22 | 38 | 36 | 18 | 30 | 28 | 32 | 30 |
| physical properties of sintered body | Vickers hardness (GPa) | 31.2 | 32.3 | 30.5 | 28.5 | 27.5 | 30.8 | 30.3 | 29.8 | 31.1 | 30.2 |
| | fracture toughness (MPa·m$^{1/2}$) | 7.5 | 7.0 | 7.9 | 8.3 | 8.4 | 6.7 | 8.0 | 7.8 | 8.0 | 8.3 |
| cutting performance | cutting length (km) | 0.7 | 0.7 | 0.8 | 0.6 | 0.6 | 0.7 | 0.9 | 1.0 | 1.5 | 1.5 |
| | life factor | fracture | fracture | wear | wear | wear | fracture | wear | fracture | wear | wear |
| notes | | EX | EX | EX | EX | EX | EX | EX | EX | EX | EX |

EX: Example

Referring to Table 2, the sintered bodies of Samples No. 2-1 to No. 2-10 with a thermal conductivity of not less than 15 W·m$^{-1}$·K$^{-1}$ and not more than 40 W·m$^{-1}$·K$^{-1}$ had a long tool life corresponding to a cutting length of 0.6 to 1.5 km.

As to Samples No. 2-4 and No. 2-5 in which the metal component was used as the binder, the sintered body had high fracture toughness. However, the sintered body had relatively high thermal conductivity. Therefore, the sintered body had a tool life corresponding to a cutting length of 0.6 km due to fracture.

material such as titanium (Ti) other than the heat-resistant alloy such as Inconel®, and is particularly applicable to high-speed cutting.

The invention claimed is:

1. A method for manufacturing a cut material, the method comprising:
preparing a nickel-based heat-resistant alloy formed of crystal grains having a fine grain size represented by a grain size number of more than 5 defined by American Society for Testing and Materials standard E112-13; and cutting the nickel-based heat-resistant alloy by using a sintered body comprising cubic boron nitride grains as hard phase grains and having a thermal conductivity of not less than 15 $W \cdot m^{-1} K^{-1}$ and not more than 31 $W \cdot m^{-1} K^{-1}$, wherein the sintered body further comprises:

a binder; and different-type hard phase grains including SiAlON, as the hard phase grains other than the cubic boron nitride grains, a ratio $V_{BN}/V_H$ of a volume $V_{BN}$ of the cubic boron nitride grains to a volume $V_H$ of the different-type hard phase grains is not less than 1 and not more than 6, the SiAlON further includes cubic SiAlON and at least one of α-SiAlON and β-SiAlON, and a peak intensity ratio Rc of an intensity at an X-ray diffraction main peak of the cubic SiAlON to a sum of respective intensities at respective X-ray diffraction main peaks of the α-SiAlON, the β-SiAlON, and the cubic SiAlON is not less than 20%.

2. The method for manufacturing the cut material according to claim 1, wherein the binder includes at least one kind of binder selected from the group consisting of at least one kind of element out of titanium, zirconium, aluminum, nickel, and cobalt, nitrides, carbides, oxides, carbonitrides, and borides of the elements, and solid solutions thereof.

3. The method for manufacturing the cut material according to claim 1, wherein a content of the hard phase grains in the sintered body is not less than 60 vol % and not more than 90 vol %.

4. The method for manufacturing the cut material according to claim 1, wherein the sintered body has a Vickers hardness of not less than 22 GPa.

5. The method for manufacturing the cut material according to claim 1, wherein the nickel-based heat-resistant alloy includes nickel of not less than 50 mass % and not more than 55 mass %, chromium of not less than 17 mass % and not more than 21 mass %, niobium of not less than 4.75 mass % and not more than 5.50 mass %, molybdenum of not less than 2.80 mass % and not more than 3.30 mass %, and iron of not less than 12 mass % and not more than 24 mass %.

6. The method for manufacturing the cut material according to claim 1, wherein the cutting of the nickel-based heat-resistant alloy is performed by using a cutting tool comprising the sintered body.

* * * * *